US012771937B2

(12) United States Patent
George

(10) Patent No.: US 12,771,937 B2
(45) Date of Patent: Oct. 20, 2026

(54) SYSTEM AND METHOD FOR REAL-TIME INFLIGHT MEASUREMENTS OF AERO-OPTICAL QUANTITIES USING AN ONBOARD WAVEFRONT SENSOR

(71) Applicant: METROLASER, INC., Laguna Hills, CA (US)

(72) Inventor: Jacob George, Downey, CA (US)

(73) Assignee: METROLASER, INC., Laguna Hills, CA (US)

( * ) Notice: Subject to any disclaimer, the term of this patent is extended or adjusted under 35 U.S.C. 154(b) by 0 days.

(21) Appl. No.: 19/202,784

(22) Filed: May 8, 2025

(65) Prior Publication Data

US 2025/0350835 A1 Nov. 13, 2025

Related U.S. Application Data

(60) Provisional application No. 63/644,412, filed on May 8, 2024.

(51) Int. Cl.

*H04N 23/68* (2023.01)
*G01J 9/02* (2006.01)
*G01J 9/00* (2006.01)

(52) U.S. Cl.

CPC .............. *H04N 23/682* (2023.01); *G01J 9/02* (2013.01); *H04N 23/6811* (2023.01); *G01J 2009/002* (2013.01)

(58) Field of Classification Search

None

See application file for complete search history.

(56) References Cited

U.S. PATENT DOCUMENTS

2009/0242702 A1* 10/2009 Cain .......................... B64C 7/00 244/129.4
2016/0255253 A1* 9/2016 Kelchner ............. H04B 10/112 348/135
2019/0360927 A1* 11/2019 Talghader ............... G01M 9/06
2021/0318534 A1* 10/2021 Iwashimizu ............ G01S 17/95
2022/0011091 A1* 1/2022 Acker ................ G01B 9/02098
2025/0350835 A1 11/2025 George

* cited by examiner

*Primary Examiner* — James M Anderson, II

(74) *Attorney, Agent, or Firm* — Haynes and Boone, LLP

(57) ABSTRACT

A system and a method for measuring, correcting, and implementing real-time adjustments for aero-optical effects for vehicle-based optical systems used in high speed or turbulent scenarios are provided. The system and method may include obtaining, via an imaging system, a wavefront measurement of air flow in a high speed or turbulent environment. The imaging system may include a wavefront sensor and optical components within a module and configured for manipulating a laser beam, and an optical window for transmitting the laser beam in-and-out through the optical window (e.g., in a beam director or "turret"). The imaging system may comprise, outside the module, a reflector or mirror positioned along an optical axis and configured to receive and reflect the laser beam from the optical window. The method may include determining wavefront distortions of the laser beam based on the wavefront measurement and determining optical degradation based on the wavefront distortions.

20 Claims, 7 Drawing Sheets

SYSTEM AND METHOD FOR REAL-TIME INFLIGHT MEASUREMENTS OF AERO-OPTICAL QUANTITIES USING AN ONBOARD WAVEFRONT SENSOR

CROSS REFERENCE TO RELATED APPLICATION

This application claims priority to U.S. Patent Application No. 63/644,412, filed May 8, 2024, all of which is incorporated by reference herein in its entirety.

FIELD OF INVENTION

Embodiments of the present disclosure relate generally to imaging techniques, and more particularly, for example, to a system and a method for real-time inflight measurements using a wavefront sensor.

BACKGROUND

Aero-optics is the study of optical distortions caused by changes in the index of refraction due to aerodynamic density gradients and particularly refers to optical distortions influenced of the flow field, such as flow turbulence, shock-waves, and boundary layers, on the optical quality of the transiting light. These distortions can occur when light propagates through air, especially at high speeds or in turbulent environments, affecting the performance of optical systems like lasers and sensors. When an optical wavefront passes through an aerodynamic flow, its phase and amplitude are modulated, resulting in distortion and loss of optical information and energy. Its phase is modulated by diffraction and by spatial and temporal variations in the refractive index due to the changes in air density. Such refractive effects cause, for example, but not limited to, an image shift, also known as boresight error, a wavefront distortion, also referred to as image blur, and a beam jitter, i.e., a variation of boresight error. Although the aero-optical effects due to the high flow field, for example, surrounding a hypersonic or supersonic vehicle can be conceptualized, as shown in FIG. 1, there is a need for an improved system and/or method that enable measuring, correcting, and implementing such real-time adjustments for the aero-optical effects for vehicle-based optical systems used in high speed or turbulent scenarios.

SUMMARY

In accordance with one or more embodiments, a method is provided. The method may be used for measuring, correcting, and implementing real-time adjustments for aero-optical effects for vehicle-based optical systems used in high speed or turbulent scenarios as disclosed herein. The method may include obtaining, via an imaging system, a wavefront measurement of air flow in a high speed or turbulent environment, wherein the imaging system may reside partially within a module, wherein the imaging system may include, within the module, a wavefront sensor and one or more optical components configured for manipulating a laser beam, and an optical window configured for transmitting the laser beam in-and-out through the optical window (e.g., in a beam director or turret), and wherein the imaging system may further include, outside the module and in the high speed or turbulent environment, a reflector or mirror disposed on a laminar flow airfoil (e.g., in a wing of a vehicle or an aircraft), wherein the reflector may be positioned along an optical axis facing the optical window and configured to receive the laser beam from the optical window and to reflect the laser beam toward the optical window; determining wavefront distortions of the laser beam, due to the high-speed turbulent flow outside the optical window or the turret, based on the wavefront measurement; and determining optical degradation based on the wavefront distortions.

In accordance with one or more embodiments, the imaging system may be configured for a double-pass configuration having the reflector disposed on the laminar flow airfoil/wing to reflect the optical beam within the high speed or turbulent environment. In accordance with one or more embodiments, determining the optical degradation based on the wavefront distortions may occur in real time.

In accordance with one or more embodiments, the high speed or turbulent environment may include a subsonic, transonic, supersonic, or hypersonic flight environment and wherein the laminar flow airfoil may be built into, or attached to, an appendage (e.g., a wing) of a subsonic, transonic, supersonic, or hypersonic vehicle.

In accordance with one or more embodiments, determining the wavefront distortions may be performed via an instantaneous phase-shift interferometry by determining a phase shift of the laser beam directly by the wavefront sensor during the air flow in the high speed or turbulent environment. In accordance with one or more embodiments, the determined optical degradation for the air flow in the high speed or turbulent environment is half of the determined wavefront distortions as there is no distortion effect presented by the high-speed laminar flow over the airfoil/wing.

In accordance with one or more embodiments, the method may further include implementing corrections to the imaging system based on the determined optical degradation. In accordance with one or more embodiments, the corrections to the imaging system may be implemented by communicating the corrections to a user, outputting the corrections to a display, and/or facilitating auto adjustments in future wavefront measurements based on the corrections.

In accordance with one or more embodiments, the imaging system may further include, outside the module and in the high speed or turbulent environment, a second reflector disposed on a second laminar flow airfoil, wherein the laser beam is further split into a second optical axis such that the second reflector is configured to receive and reflect the laser beam along the second optical axis to-and-from the optical window.

In accordance with one or more embodiments, a system is provided. The system may be configured for measuring, correcting, and implementing real-time adjustments for aero-optical effects for vehicle-based optical systems used in high speed or turbulent scenarios as disclosed herein. The system may include an imaging system configured for wavefront measurements of air flows in a high speed or turbulent environment, the imaging system including within a module, a wavefront sensor and one or more optical components configured for manipulating a laser beam, and an optical window configured for transmitting the laser beam in-and-out through the optical window, and outside the module and in the high speed or turbulent environment, a reflector disposed on a laminar flow airfoil, wherein the reflector is positioned along an optical axis facing the optical window and is configured to receive the laser beam from the optical window and to reflect the laser beam toward the optical window; a processor and a non-transitory computer readable medium operably coupled thereto, the processor operationally coupled and configured to control the imaging system and to acquire data from the imaging system, wherein the non-transitory computer readable medium comprising a plurality of instructions stored in association therewith that are accessible to, and executable by, the processor, to perform one or more operations, which may include obtaining, via the imaging system, a wavefront measurement of air flow; determining wavefront distortions of the laser beam based on the wavefront measurement; and determining optical degradation based on the wavefront distortions.

In accordance with one or more embodiments, the imaging system may be configured for a double-pass configuration having the reflector disposed on the laminar flow airfoil to reflect the optical beam within the high speed or turbulent environment.

In accordance with one or more embodiments, the imaging system may further include, outside the module and in the high speed or turbulent environment, a second reflector disposed on a second laminar flow airfoil, wherein the laser beam is further split into a second optical axis such that the second reflector is configured to receive and reflect the laser beam along the second optical axis to-and-from the optical window.

In accordance with one or more embodiments, determining the optical degradation based on the wavefront distortions may occur in real time and determining the wavefront distortions may be performed via an instantaneous phase-shift interferometry by determining a phase shift of the laser beam directly by the wavefront sensor during the air flow in the high speed or turbulent environment.

In accordance with one or more embodiments, the high speed or turbulent environment may include a subsonic, transonic, supersonic, or hypersonic flight environment and wherein the laminar flow airfoil may be built into, or attached to, an appendage (e.g., a wing) of a subsonic, transonic, supersonic, or hypersonic vehicle.

In accordance with one or more embodiments, the one or more operations may further include implementing corrections to the imaging system based on the determined optical degradation by communicating the corrections to a user, outputting the corrections to a display, and/or facilitating auto adjustments in future wavefront measurements based on the corrections.

In accordance with one or more embodiments, a vehicle is provided. The vehicle may include an on-board optical system used in high speed or turbulent scenarios for measuring, correcting, and implementing real-time adjustments for aero-optical effects as disclosed herein. The vehicle may include an imaging system configured for wavefront measurements of turbulent air flows in a subsonic, transonic, supersonic, or hypersonic environment, the imaging system including within a module of the vehicle, a wavefront sensor and one or more optical components configured for manipulating a laser beam, and an optical window configured for transmitting the laser beam in-and-out through the optical window, and outside the module and attached to the vehicle, a reflector disposed on a laminar flow airfoil, wherein the reflector is positioned along an optical axis facing the optical window and is configured to receive the laser beam from the optical window and to reflect the laser beam toward the optical window; a processor and a non-transitory computer readable medium operably coupled thereto, the processor operationally coupled and configured to control the imaging system and to acquire data from the imaging system, wherein the non-transitory computer readable medium comprising a plurality of instructions stored in association therewith that are accessible to, and executable by, the processor, to perform one or more operations, which may include obtaining, via the imaging system, a wavefront measurement of a turbulent air flow; determining wavefront distortions of the laser beam based on the wavefront measurement; and determining optical degradation based on the wavefront distortions.

In accordance with one or more embodiments, the vehicle may further include a wing, wherein the laminar flow airfoil is built into, or attached to, the wing. In accordance with one or more embodiments, the vehicle may further include a second wing comprising a second laminar flow airfoil, wherein the imaging system may further include, outside the module, a second reflector disposed on the second laminar flow airfoil, wherein the laser beam may be further split into a second optical axis such that the second reflector may be configured to receive and reflect the laser beam along the second optical axis to-and-from the optical window.

In accordance with one or more embodiments, determining the optical degradation based on the wavefront distortions may occur in real time and determining the wavefront distortions may be performed via an instantaneous phase-shift interferometry by determining a phase shift of the laser beam directly by the wavefront sensor during the turbulent air flow in the high speed or turbulent environment.

In accordance with one or more embodiments, the one or more operations may further include implementing corrections to the imaging system based on the determined optical degradation by communicating the corrections to a user, outputting the corrections to a display, and/or facilitating auto adjustments in future wavefront measurements based on the corrections.

Additional aspects, embodiments, implementations, features, and advantages of the present disclosure will become apparent from the following detailed description.

BRIEF DESCRIPTION OF THE DRAWINGS

For a more complete understanding of the principles disclosed herein, and the advantages thereof, reference is now made to the following descriptions taken in conjunction with the accompanying drawings, in which.

Figure 1:
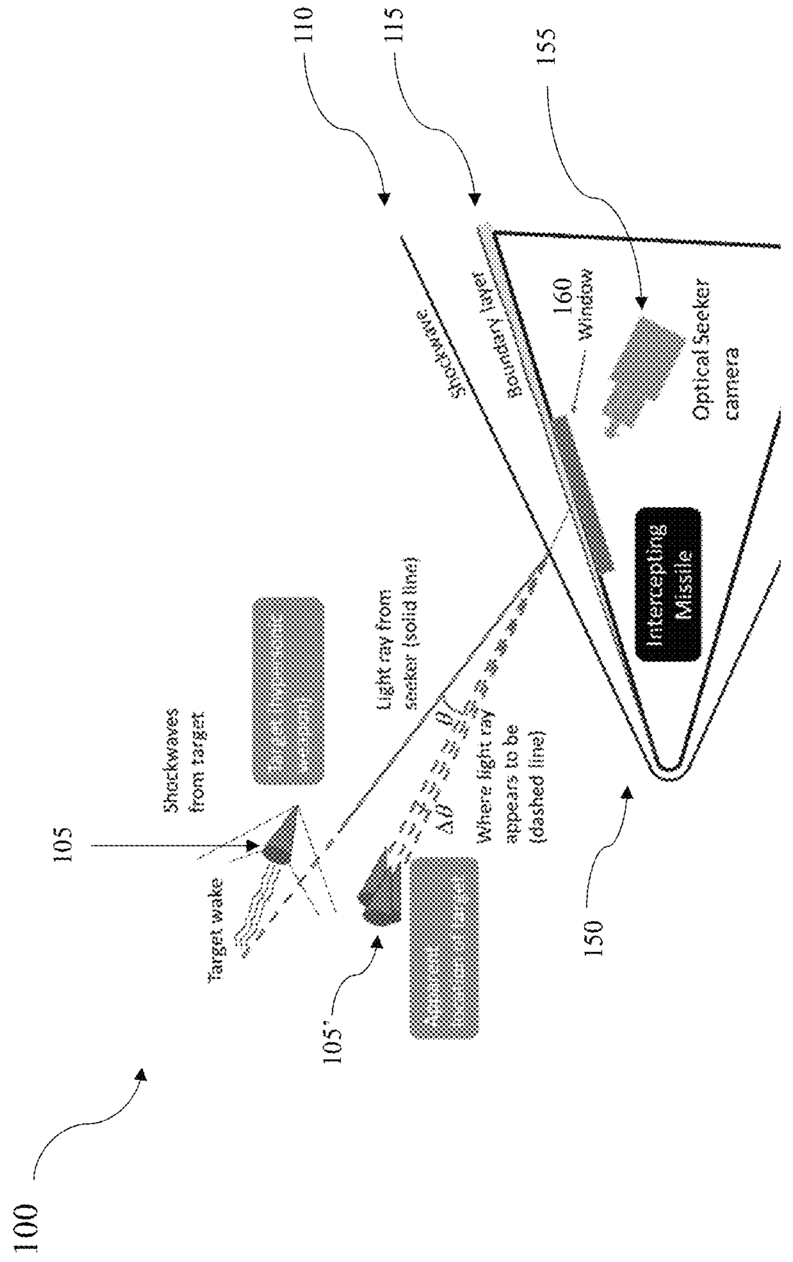
FIG. 1 illustrates an aero-optical effect in a hypersonic flight, in accordance with various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

In accordance with various embodiments, the disclosed system and method described herein may be used for measuring, correcting, and implementing real-time adjustments for aero-optical effects for vehicle-based optical systems used in high speed or turbulent scenarios. In one or more embodiments, the disclosed system and method may employ an imaging system to emit an optical beam, e.g., a laser beam, such as but not limited to, a continuous wave laser beam, from a wavefront sensor to conduct a wavefront measurement of air flow in a high speed or turbulent environment. In one or more embodiments, the imaging system may reside partially within a module, e.g., a vehicle travelling in subsonic, transonic, supersonic, or hypersonic environment. In various embodiments, the imaging system may include, within the module, a wavefront sensor and one or more optical components. The sensor and optical components, such as, beam expanders, quarter wave plates, half wave plates, beam splitters, polarized beam splitters, reflectors, objective lenses, collimators, photomasks, etc., can be used for manipulating a laser beam from a laser source. The imaging system further includes an optical window configured for transmitting the laser beam in-and-out through the optical window. In one or more embodiments, the optical window may include, or may be part of, any exiting apertures, with geometries that include, for example, but not limited to, turrets, hemispheres, curved or flat surfaces that permit an optical/laser beam transit in-and-out through the optical window. In other words, the optical window may be formed in a turret of the module or vehicle travelling in subsonic, transonic, supersonic, or hypersonic environment. Said another way, the optical window enables transmission of the laser beam into, and from, a turbulent environment outside the optical window (e.g., of a beam director or a turret) of a high-speed vehicle travelling at subsonic, transonic, supersonic or hypersonic speed.

In one or more embodiments, the imaging system may include, outside the module and in the high speed or turbulent environment (i.e., subsonic, transonic, supersonic, or hypersonic environment), a reflector disposed on a laminar flow airfoil. In various embodiments, the laminar flow airfoil does not introduce wavefront distortions. In other words, the laminar flow airfoil is designed to maintain laminar flow over the airfoil and therefore, introduces no wavefront distortions. In various embodiments, the reflector may be positioned along an optical axis facing the optical window such that it can be configured to receive the laser beam from the optical window and to reflect the laser beam toward the optical window. In one or more embodiments, the path of the laser beam is outside of the module (i.e., outside the vehicle travelling at subsonic, transonic, supersonic, or hypersonic speed), which can affect optical property of the laser beam. As such, in one or more embodiments, the disclosed system and method further includes determining wavefront distortions of the laser beam based on the wavefront measurement during (turbulent) the high speed or turbulent environment, and determining optical degradation based on the wavefront distortions. In one or more embodiments, the disclosed system and method permit real-time measurements of the wavefront measurements and the resultant optical degradations that would be due to the geometry of the exiting aperture alone on the flight vehicle.

As disclosed herein, the system and method may include a wavefront sensor for onboard integration into subsonic, supersonic, and hypersonic flight vehicles. The disclosed capabilities for onboard measurements at a fast temporal scale to potentially enable their deployment in a feedback loop to perform corrections to the wavefront distortions. This, in turn, may advance the development of laser-based guidance of advanced supersonic and hypersonic weapons and interceptors, in accordance with one or more embodiments. In other words, such measurements may enable the disclosed system/method with integrated onboard wavefront sensors to provide accurate and spatially resolved wavefront measurements.

The following descriptions with respect to FIGS. 1, 2A, 2B, 2C, 3A, 3B, 3C, 4, and 5 provide detailed information of the disclosed system and method for vehicle-based imaging systems used in high speed or turbulent scenarios.

FIG. 1 shows a depiction of scenario 100 of an aero-optical effect in a hypersonic flight, in accordance with various embodiments. The scenario 100 depicted in FIG. 1 includes when a target 105 and a vehicle 150 (with an observing optical camera 155) are travelling at a high speed, such as a subsonic, transonic, supersonic, or hypersonic speed. When travelling at such high speeds, light rays from the target 105 can be distorted due to the changes in the index of refraction in the aerodynamic density gradients in the flow field, such as flow turbulence, shockwaves, and boundary layers. In other words, the optical quality of the transiting light can be distorted as shown in FIG. 1. Thus, for an observer, such as the optical camera 155, the target 105 appears as 105' at an angle θ with aberration angles of Δθ, due to the shockwave 110 and boundary layer 115 when the intercepting vehicle 150 is moving at a subsonic, transonic, supersonic, or hypersonic speed. These distortions, indicated by θ and Δθ, can occur when light propagates through air, especially at high speeds or in turbulent environments, affecting the performance of optical systems like lasers and sensors. When an optical wavefront passes through an aerodynamic flow, its phase and amplitude are modulated, resulting in distortion and loss of optical information and energy. Its phase is modulated by diffraction and by spatial and temporal variations in the refractive index due to the changes in air density. Such refractive effects cause, for example, but not limited to, an image shift, indicated as θ and Δθ, also known as boresight error and lead to wavefront distortions, also referred to as image blur, and a beam jitter, i.e., a variation of boresight error. The disclosed system and method herein can enable measuring and correcting such aero-optical effects so that real-time adjustments can be implemented for vehicle-based optical/imaging systems so that they can be used effectively in high speed or turbulent environments.

Figure 2A:
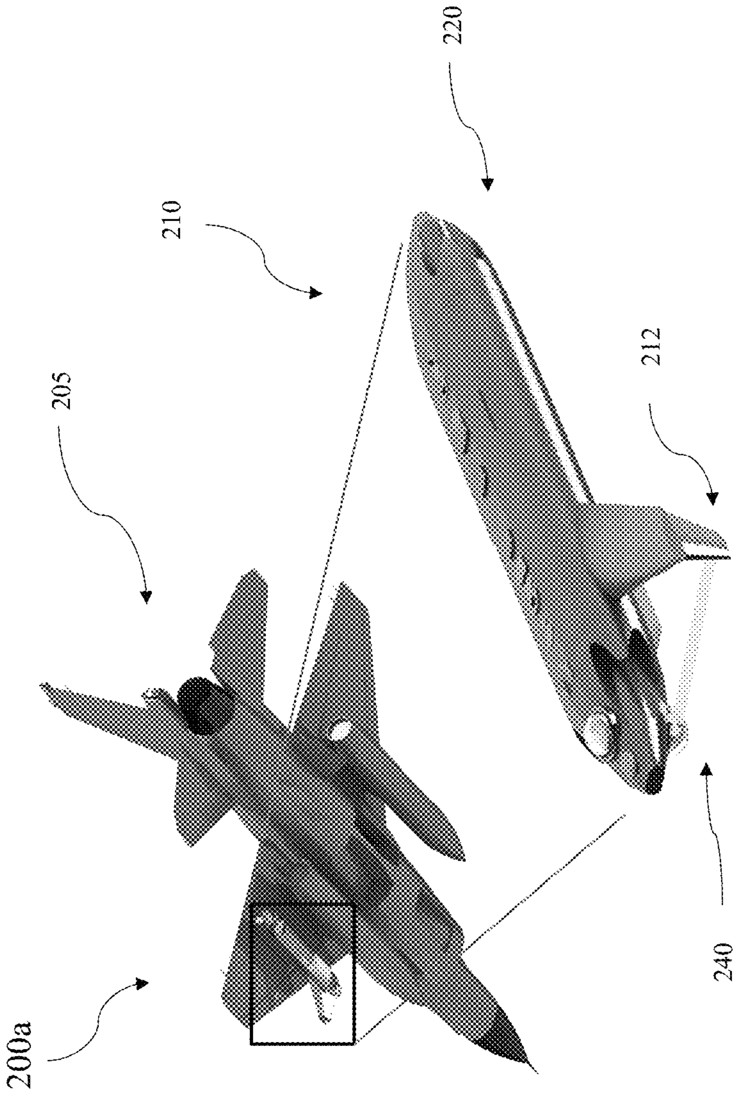
FIGS. 2A, 2B, and 2C illustrate an example imaging system for a vehicle-based optical system used in a high speed or turbulent environment, in accordance with various embodiments.
Figure 2B:
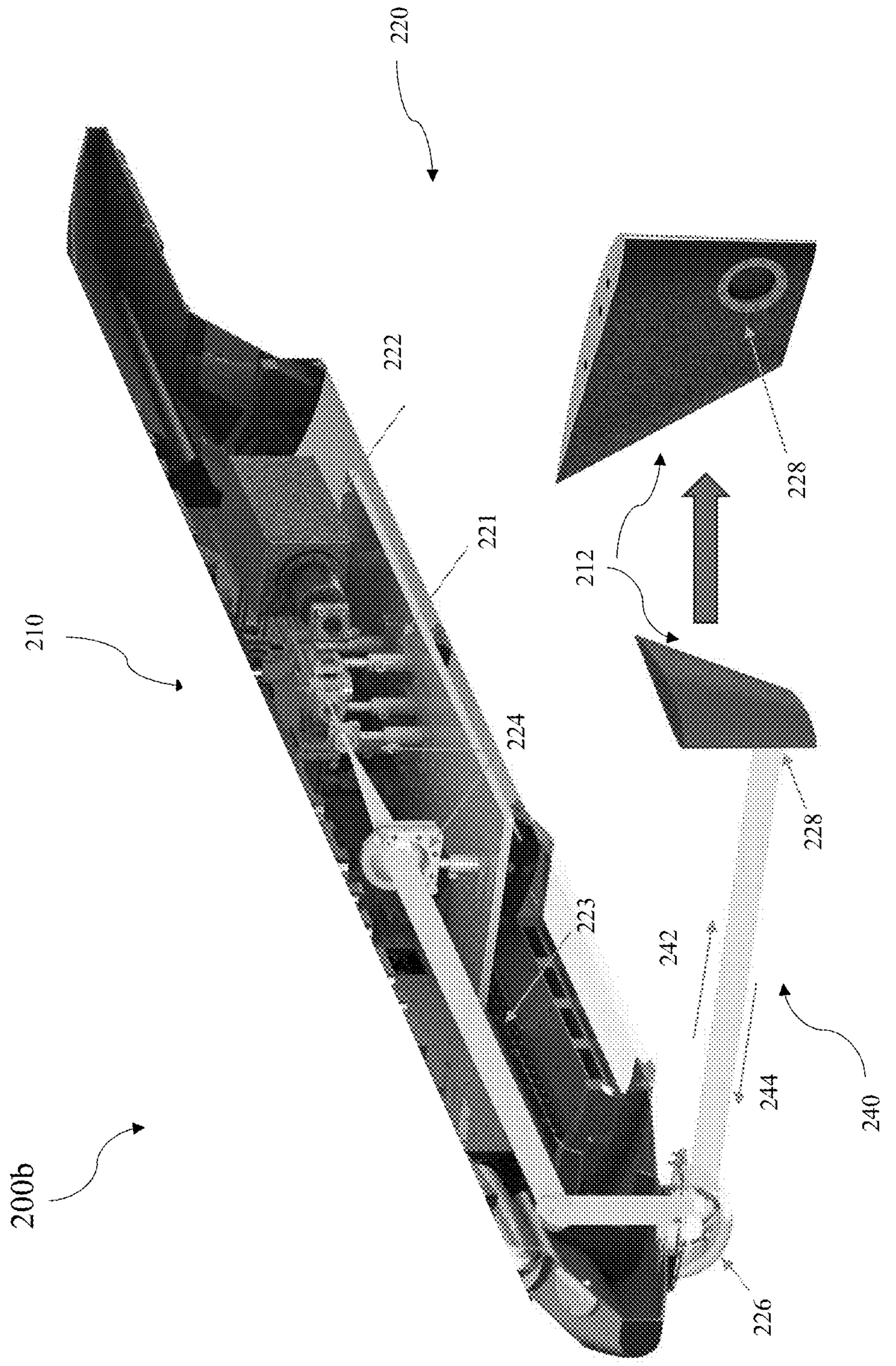
Figure 2C:
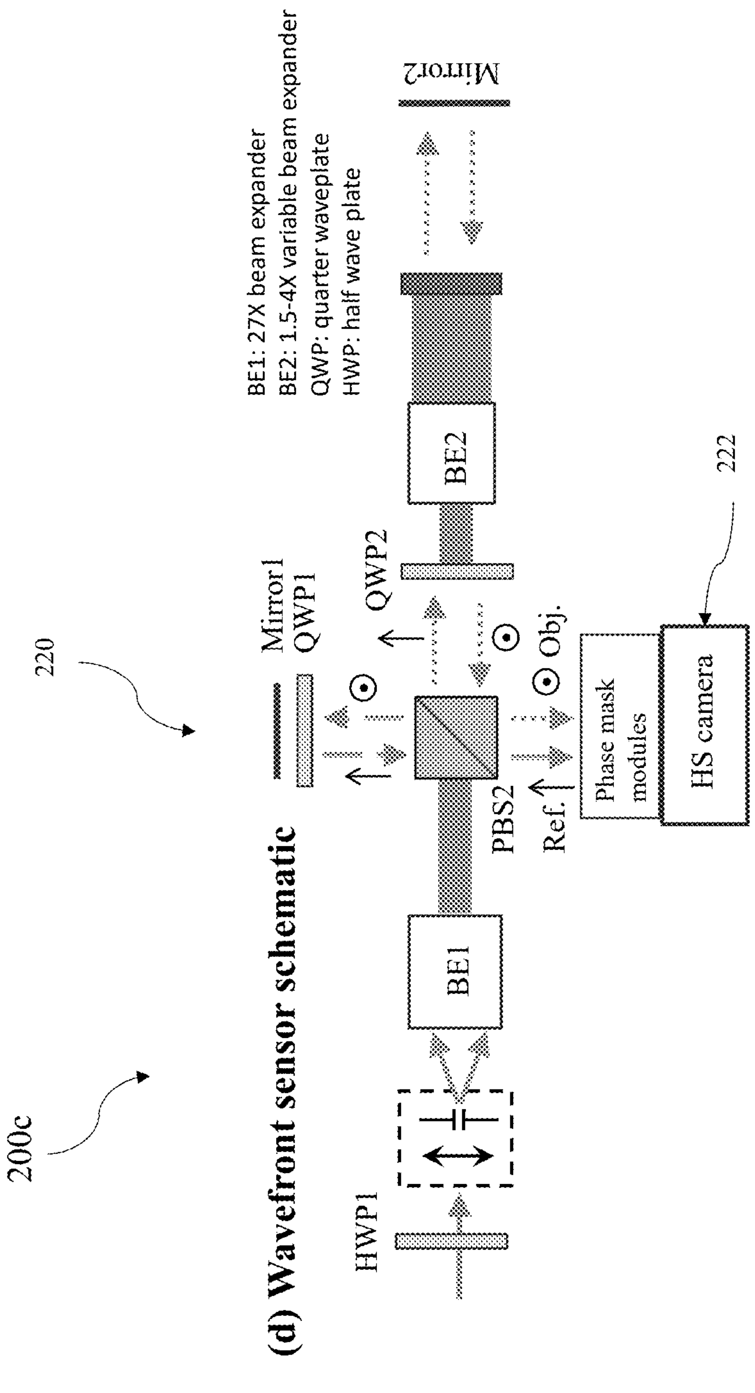

FIGS. 2A, 2B, and 2C illustrate an example imaging system for a vehicle-based optical system used in a high speed or turbulent environment, in accordance with various embodiments. These systems enable measuring, correcting, and implementing real-time adjustments for aero-optical effects, in accordance with various embodiments. FIG. 2A shows a perspective view 200*a* of a vehicle 205 (e.g., an aircraft or a fighter jet) having a module 210 (e.g., flight pod under the wing of the aircraft) to represent a unique flying laboratory that can be used to house an imaging system 220. Similarly, FIG. 2B shows a cross-section view 200*b* of the imaging system 220 within the module 210 and FIG. 2C shows a detailed view 200*c* of components of the imaging system 220. Although the imaging system 220 is shown as within the module 210 in FIG. 2A, it can also be integrated into the vehicle 205. In one or more embodiments, the imaging system 220 may be placed within other parts of the vehicle 205, such as, but not limited to, the fuselage, wing, rudder, etc., if the vehicle 205 is an aircraft.

As shown in FIGS. 2A, 2B, and 2C, the imaging system 220 includes a wavefront sensor 221, a high speed camera 222, a laser source 223, optical components 224, an optical window 226, and a reflector 228 (also referred to simply as "mirror") that is disposed on a laminar flow airfoil 212. In various embodiments, the laminar flow airfoil 212 may be built into (as a wing), or attached to, an appendage (e.g., a wing) of the vehicle 205, which may be a subsonic, transonic, supersonic, or hypersonic vehicle.

In accordance with one or more embodiments, the imaging system 220 is configured in a double-pass configuration using the reflector 228 within the laminar flow airfoil 212 to reflect an optical/laser beam 240, and therefore, the actual optical degradation will be halved in the real situation of a single transit of the optical beam. In one or more embodiments, the imaging system 200 may be directed to wavefront sensing and flow diagnostics, in some instances, specifically with new interferometry technology, and made possible by digital holography and high-speed digital cameras. Typical measurements may be performed using Hartmann sensors and they measure the tilt of the wavefront and not the phase, and the spatial resolution is reduced because many pixels are required for each tilt. The imaging system 200 resolves for the phase directly and instantaneously, using instantaneous phase shifting interferometry, as needed for turbulent flows and hypersonic application. In addition, the imaging system 200 can provide aero-optical quantities-Strehl ratio, σ, (RMS wavefront distortion, i.e., wavefront quality), Bore site error (the tilt of the wavefront), jitter, structural changes in the flow and/or wavefront, i.e., coherence, size, and regularity of structures, and temporal characteristics of the flow structure, i.e., decorrelation time, in accordance one or more embodiments.

As depicted in FIGS. 2A, 2B, and 2C, the wavefront sensor 221, the high speed camera 222, the laser 223, various optical components 224, and the optical window 226 of the imaging system 220 are included within the module 210 (the flight pod), whereas the reflector 228 is positioned outside the module 210 and affixed to the laminar flow airfoil 212. Thus, the laser beam 240 is transmitted through the optical window 226, designated as a probe beam 242 (e.g., incoming beam) that arrives at the reflector 228 and is reflected as a reflected beam 244 towards the optical window 226. In one or more embodiments, the optical window 226 may include any pass-through geometries with optical transparency, e.g., optical windows, such as, but not limited to, turrets, hemispheres, curved or flat surfaces that permit optical beam transit/transmission.

In one or more embodiments, since both the probe beam 242 and the reflected beam 244 of the laser beam 240 can be configured to traverse through the laminar or turbulent airflow during a high speed or turbulent environment, the distortions created at the wavefronts of the laser beam 240 during such flow can be measured by the wavefront sensor 221 of the imaging system 220. From such wavefront distortions in the high speed or turbulent environment, optical degradations can be determined and corrections can be made and implemented for use in downstream applications, including for example, but not limited to, communicating the corrections to a user, outputting the corrections to a display, and/or facilitating auto adjustments in future wavefront measurements based on the corrections.

Figure 3C:
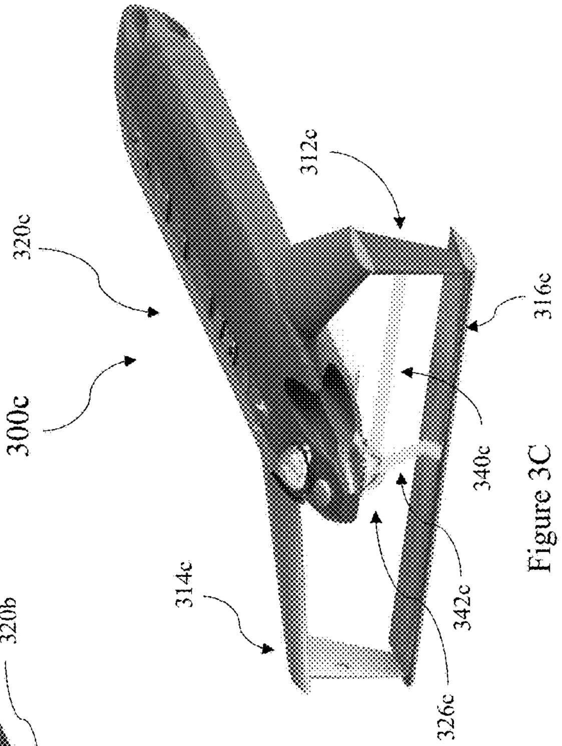
FIGS. 3A, 3B, and 3C illustrate various embodiments of an example imaging system for a vehicle-based optical system used in a high speed or turbulent environment, in accordance with various embodiments.
Figure 3B:
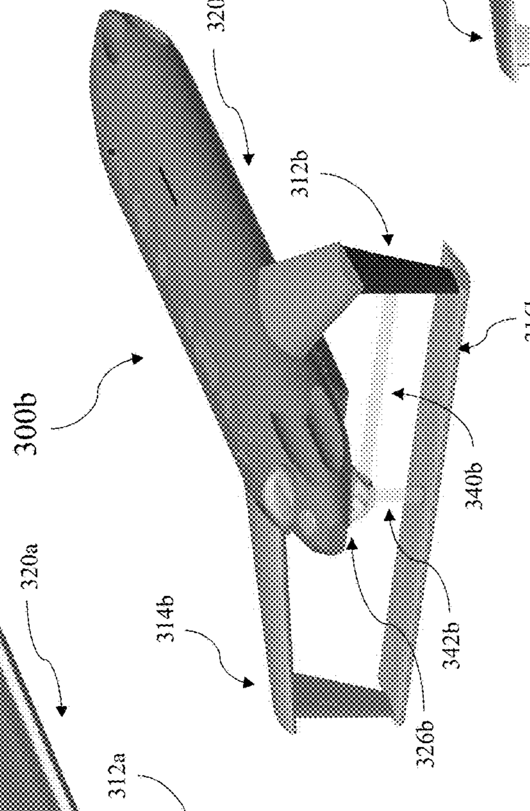
Figure 3A:
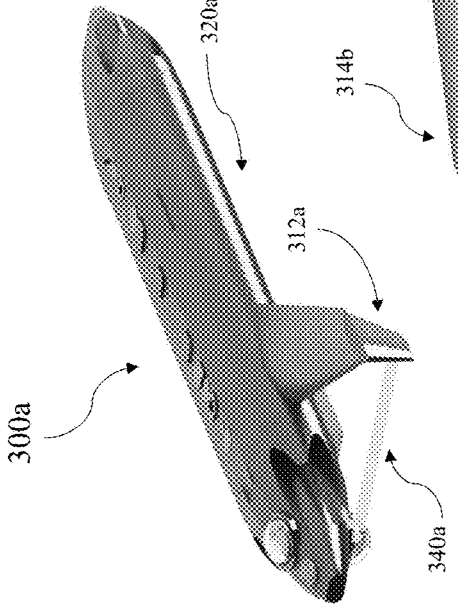

FIGS. 3A, 3B, and 3C illustrate various embodiments of an example imaging system for a vehicle-based optical system used in a high speed or turbulent environment, in accordance with various embodiments. FIG. 3A depicts an imaging system 320*a* onboard a module 300*a* (can also be referred to herein as vehicle 300*a*) with various optical and imaging components, including optical window 326*a*, within the module 300*a* with a laminar flow airfoil 312*a* that houses a reflector (not shown) outside the module 300*a*, where the reflector is configured to receive and reflect a laser beam 340*a* (with a probe beam and a reflected beam) in a laminar or turbulent airflow during a high speed or turbulent environment. FIG. 3B depicts an imaging system 320*b* onboard a module 300*b* (can also be referred to herein as vehicle 300*b*) with various optical and imaging components, including optical window 326*b*, within the module 300*b* with a laminar flow airfoil 312*b* and a laminar flow airfoil 314*b* that respectively house a reflector (not shown) outside the module 300*b*, where the reflector may be configured to receive and reflect a laser beam 340*b* (with a probe beam and a reflected beam) in two directions, as shown in FIG. 3B, in a laminar or turbulent airflow during a high speed or turbulent environment. FIG. 3C depicts an imaging system 320*c* onboard a module 300*c* (can also be referred to herein as vehicle 300*c*) with various optical and imaging components, including optical window 326*c*, within the module 300*c* with a laminar flow airfoil 312*c* and a laminar flow airfoil 314*c* that respectively house a reflector (not shown) outside the module 300*c*, where the reflector may be configured to receive and reflect a laser beam 340*c* (with a probe beam and a reflected beam) in two directions and angles, as shown in FIG. 3C, in a laminar or turbulent airflow during a high speed or turbulent environment.

As disclosed herein, the imaging systems 320*a*, 320*b*, and 320*c* enable measuring, correcting, and implementing real-time adjustments for aero-optical effects, in accordance with various embodiments. In one or more embodiments, the imaging systems 320*a*, 320*b*, and 320*c* include similar or identical components as in the imaging system 200, except for the locations of the reflector that is attached to the laminar flow airfoil 212. Thus, the imaging systems 320*a*, 320*b*, and 320*c* are shown as within the modules 300*a*, 300*b*, and 300*c*, or can be integrated into the vehicles 300*a*, 300*b*, and 300*c*, respectively in FIGS. 3A, 3B, and 3C. In one or more embodiments, the imaging systems 320*a*, 320*b*, and 320*c* may be placed within other parts of the vehicles 300*a*, 300*b*, and 300*c*, such as, but not limited to, the fuselage, wing, rudder, etc., if the vehicles 300*a*, 300*b*, and 300*c* are an aircraft. In various embodiments, the laminar flow airfoils 312*a*, 312*b*, 314*b*, 312*c*, and 314*c* may be built into, or attached to, an appendage (e.g., a wing) of the vehicles 300*a*, 300*b*, or 300*c*. In various embodiments, vehicles 300*a*, 300*b*, or 300*c* may be subsonic, transonic, supersonic, or hypersonic vehicles or modules 300*a*, 300*b*, and 300*c* may move at subsonic, transonic, supersonic, or hypersonic speeds/velocities.

In one or more embodiments, similarly to the imaging system 200, the imaging systems 320*a*, 320*b*, and 320*c* are configured for wavefront measurements in a double-pass configuration using the reflectors (not shown) within the laminar flow airfoils to reflect the laser beams, and therefore, the actual optical degradation will be halved in the real situation of a single transit of the optical beam. In one or more embodiments, the imaging systems 320*a*, 320*b*, and 320*c* are directed to wavefront sensing and flow diagnostics, in some instances, specifically with new interferometry technology, and made possible by digital holography and high-speed digital cameras. Typical measurements may be performed using Hartmann sensors and they measure the tilt of the wavefront and not the phase, and the spatial resolution is reduced because many pixels are required for each tilt. The imaging systems 300*a*, 300*b*, and 300*c* resolve for the phase directly and instantaneously, using instantaneous phase shifting interferometry, as needed for turbulent flows and hypersonic application. In addition, the imaging systems 300*a*, 300*b*, and 300*c* can provide aero-optical quantities-Strehl ratio, σ, (RMS wavefront distortion, i.e., wavefront quality), Bore site error (the tilt of the wavefront), jitter, structural changes in the flow and/or wavefront, i.e., coherence, size, and regularity of structures, and temporal characteristics of the flow structure, i.e., decorrelation time, in accordance one or more embodiments.

Figure 4:
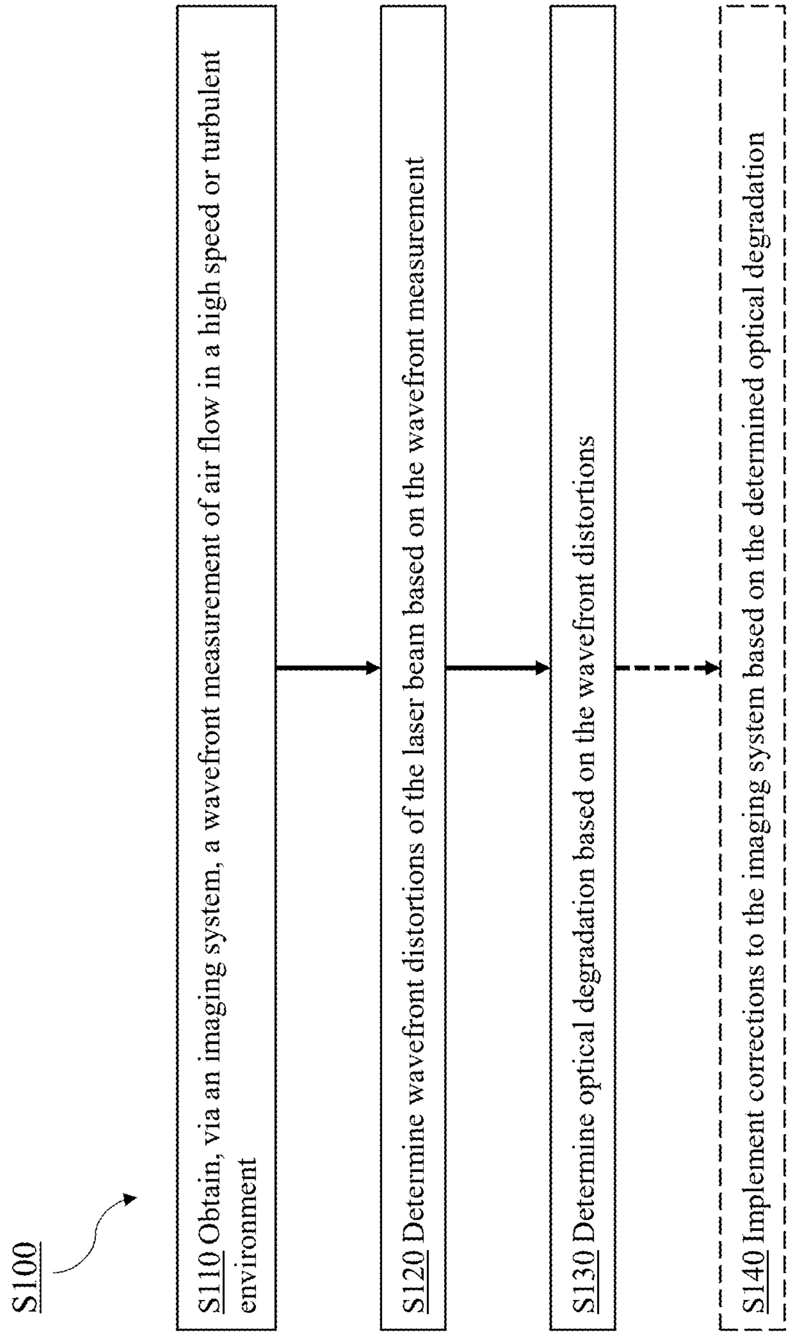
FIG. 4 illustrates a flowchart for a method, in accordance with one or more embodiments.

FIG. 4 illustrates a flowchart for a method S100, in accordance with one or more embodiments. In one or more embodiments, the method S100 may be used for measuring, correcting, and implementing real-time adjustments for aero-optical effects for vehicle-based optical systems used in high speed or turbulent scenarios as disclosed herein. As illustrated in FIG. 4, the method S100 includes, at step S110, obtaining, via an imaging system, a wavefront measurement of air flow in a high speed or turbulent environment, such as in a subsonic, transonic, supersonic, or hypersonic environment. In one or more embodiments, the imaging system may include an imaging system, such as imaging systems 220, 320*a*, 320*b*, or 320*c*, as described with respect to FIGS. 2A, 2B, 2C, 3A, 3B, and 3C.

In one or more embodiments of the method S100, the imaging system may reside partially within a module. In one or more embodiments, the imaging system may include, within the module, a wavefront sensor and one or more optical components configured for manipulating a laser beam, and an optical window configured for transmitting the laser beam in-and-out through the optical window. In one or more embodiments, the module may include a module, such as modules 210, 300*a*, 300*b*, or 300*c*, the wavefront sensor may include a wavefront sensor, such as wavefront sensor 221, the one or more optical components may include one or more optical components, such as optical components 224, the optical window may include an optical window, such as optical windows 226, 326*a*, 326*b*, and 326*b*, as described with respect to FIGS. 2A, 2B, 2C, 3A, 3B, and 3C.

In one or more embodiments of the method S100, the imaging system may further include, outside the module and in the high speed or turbulent environment, a reflector disposed on a laminar flow airfoil. In one or more embodiments, the reflector may be positioned along an optical axis facing the optical window and configured to receive the laser beam from the optical window and to reflect the laser beam toward the optical window. In one or more embodiments, the reflector may include a reflector, such reflectors 228 and reflectors of modules 300*a*, 300*b*, and 300*c*, as described with respect to FIGS. 2A, 2B, 2C, 3A, 3B, and 3C.

As further illustrated in FIG. 4, the method S100 includes, at step S120, determining wavefront distortions of the laser beam based on the wavefront measurement; and at step S120, determining optical degradation based on the wavefront distortions.

In accordance with one or more embodiments of the method S100, the imaging system may be configured for a double-pass configuration having the reflector disposed on the laminar flow airfoil to reflect the optical beam within the high speed or turbulent environment. In accordance with one or more embodiments, determining the optical degradation based on the wavefront distortions may occur in real time.

In accordance with one or more embodiments of the method S100, the high speed or turbulent environment may include a subsonic, transonic, supersonic, or hypersonic flight environment and wherein the laminar flow airfoil may be built into, or attached to, an appendage (e.g., a wing) of a subsonic, transonic, supersonic, or hypersonic vehicle.

In accordance with one or more embodiments of the method S100, determining the wavefront distortions may be performed via an instantaneous phase-shift interferometry by determining a phase shift of the laser beam directly by the wavefront sensor during the air flow in the high speed or turbulent environment. In accordance with one or more embodiments, the determined optical degradation for the air flow in the high speed or turbulent environment is half of the determined wavefront distortions.

In accordance with one or more embodiments, the method S100 may further include, optionally at step S140, implementing corrections to the imaging system based on the determined optical degradation. In one or more embodiments, the corrections to the imaging system may be implemented by communicating the corrections to a user, outputting the corrections to a display, and/or facilitating auto adjustments in future wavefront measurements based on the corrections.

In accordance with one or more embodiments of the method S100, the imaging system may further include, outside the module and in the high speed or turbulent environment, a second reflector disposed on a second laminar flow airfoil (such as, in laminar flow airfoil 314*b* and 314*c*, as described with respect to FIGS. 3B and 3C), wherein the laser beam is further split into a second optical axis such that the second reflector is configured to receive and reflect the laser beam along the second optical axis to-and-from the optical window.

Figure 5:
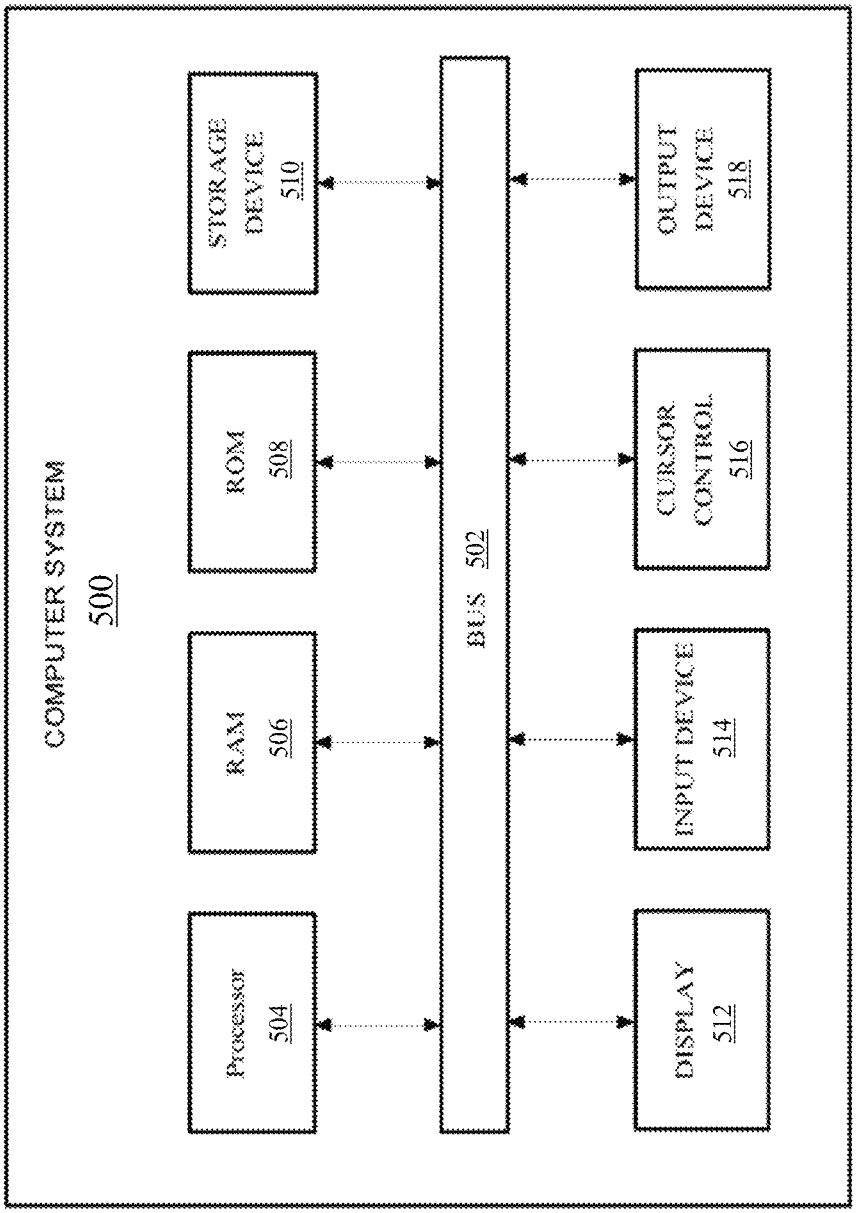
FIG. 5 is a block diagram illustrating an example computer system with which embodiments of the disclosed system and method may be implemented, in accordance with various embodiments.

FIG. 5 is a block diagram illustrating an example computer system 500, with which embodiments of the disclosed system and method, in accordance with various embodiments. For example, the illustrated computer system 500 can be a local or remote computer system operatively connected to the disclosed system and method for performing imaging operations, such as those described with respect to FIGS. 1, 2A, 2B, 2C, 3A, 3B, 3C, and 4.

In various embodiments of the present teachings, computer system 500 can include a bus 502 or other communication mechanism for communicating information and a processor 504 coupled with bus 502 for processing information. In various embodiments, computer system 500 can also include a memory, which can be a random-access memory (RAM) 506 or other dynamic storage device, coupled to bus 502 for determining instructions to be executed by processor 504. Memory can also be used for storing temporary variables or other intermediate information during execution of instructions to be executed by processor 504. In various embodiments, computer system 500 can further include a read only memory (ROM) 508 or other static storage device coupled to bus 502 for storing static information and instructions for processor 504. A storage device 510, such as a magnetic disk or optical disk, can be provided and coupled to bus 502 for storing information and instructions.

In various embodiments, computer system 500 can be coupled via bus 502 to a display 512, such as a cathode ray tube (CRT) or liquid crystal display (LCD), for displaying information to a computer user. An input device 514, including alphanumeric and other keys, can be coupled to bus 502 for communication of information and command selections to processor 504. Another type of user input device is a cursor control 516, such as a mouse, a trackball or cursor direction keys for communicating direction information and command selections to processor 504 and for controlling cursor movement on display 512. This input device 514 typically has two degrees of freedom in two axes, a first axis (i.e., x) and a second axis (i.e., y), that allows the device to specify positions in a plane. However, it should be understood that input devices 514 allowing for 3-dimensional (x, y and z) cursor movement are also contemplated herein. In accordance with various embodiments, components 512/514/516, together or individually, can make up a control system that connects the remaining components of the computer system to the systems herein and methods conducted on such systems, and controls execution of the methods and operation of the associated system.

In various embodiments, the computer system 500 includes an output device 518. In various embodiments, the output device 518 can be a wireless device, a computing device, a portable computing device, a communication device, a printer, a graphical user interface (GUI), a gaming controller, a joy-stick controller, an external display, a monitor, a mixed reality device, an artificial reality device, or a virtual reality device.

Consistent with certain implementations of the present teachings, results can be provided by computer system 500 in response to processor 504 executing one or more sequences of one or more instructions contained in memory 506. Such instructions can be read into memory 506 from another computer-readable medium or computer-readable storage medium, such as storage device 510. Execution of the sequences of instructions contained in memory 506 can cause processor 504 to perform the processes described herein. Alternatively, hard-wired circuitry can be used in place of or in combination with software instructions to implement the present teachings. Thus, implementations of the present teachings are not limited to any specific combination of hardware circuitry and software.

The term "computer-readable medium" (e.g., data store, data storage, etc.) or "computer-readable storage medium" as used herein refers to any media that participates in providing instructions to processor 504 for execution. Such a medium can take many forms, including but not limited to, non-volatile media, volatile media, and transmission media. Examples of non-volatile media can include, but are not limited to, dynamic memory, such as memory 506. Examples of transmission media can include, but are not limited to, coaxial cables, copper wire, and fiber optics, including the wires that comprise bus 502.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, another memory chip or cartridge, or any other tangible medium from which a computer can read.

In addition to computer-readable medium, instructions or data can be provided as signals on transmission media included in a communications apparatus or system to provide sequences of one or more instructions to processor 504 of computer system 500 for execution. For example, a communication apparatus may include a transceiver having signals indicative of instructions and data. The instructions and data are configured to cause one or more processors to implement the functions outlined in the disclosure herein. Representative examples of data communications transmission connections can include, but are not limited to, telephone modem connections, wide area networks (WAN), local area networks (LAN), infrared data connections, NFC connections, etc.

It should be appreciated that the methodologies described herein, flow charts, diagrams and accompanying disclosure can be implemented using computer system 500 as a standalone device or on a distributed network or shared computer processing resources such as a cloud computing network.

The methodologies described herein may be implemented by various means depending upon the application. For example, these methodologies may be implemented in hardware, firmware, software, or any combination thereof. For a hardware implementation, the processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

In various embodiments, the methods of the present teachings may be implemented as firmware and/or a software program and applications written in conventional programming languages such as C, C++, Python, etc. If implemented as firmware and/or software, the embodiments described herein can be implemented on a non-transitory computer-readable medium in which a program is stored for causing a computer to perform the methods described above. It should be understood that the various engines described herein can be provided on a computer system, such as computer system 500, whereby processor 504 would execute the analyses and determinations provided by these engines, subject to instructions provided by any one of, or a combination of, memory components 506/508/510 and user input provided via input device 514.

While the present teachings are described in conjunction with various embodiments, it is not intended that the present teachings be limited to such embodiments. On the contrary, the present teachings encompass various alternatives, modifications, and equivalents, as will be appreciated by those of skill in the art. In describing the various embodiments, the specification may have presented a method and/or process as a particular sequence of steps. However, to the extent that the method or process does not rely on the particular order of steps set forth herein, the method or process should not be limited to the particular sequence of steps described, and one skilled in the art can readily appreciate that the sequences may be varied and still remain within the spirit and scope of the various embodiments.

Embodiments

Embodiment 1. A method, comprising: obtaining, via an imaging system, a wavefront measurement of air flow in a high speed or turbulent environment, wherein the imaging system may reside partially within a module, wherein the imaging system may include, within the module, a wavefront sensor and one or more optical components configured for manipulating a laser beam, and an optical window configured for transmitting the laser beam in-and-out through the optical window, and wherein the imaging system may further include, outside the module and in the high speed or turbulent environment, a reflector disposed on a laminar flow airfoil, wherein the reflector may be positioned along an optical axis facing the optical window and configured to receive the laser beam from the optical window and to reflect the laser beam toward the optical window; determining wavefront distortions of the laser beam based on the wavefront measurement; and determining optical degradation based on the wavefront distortions.

Embodiment 2. The method of embodiment 1, wherein the imaging system is configured for a double-pass configuration having the reflector disposed on the laminar flow airfoil to reflect the optical beam within the high speed or turbulent environment.

Embodiment 3. The method of embodiments 1 or 2, wherein determining the optical degradation based on the wavefront distortions occurs in real time.

Embodiment 4. The method of any one of embodiments 1-3, wherein the high speed or turbulent environment comprises a subsonic, transonic, supersonic, or hypersonic flight environment and wherein the laminar flow airfoil is built into, or attached to, an appendage (e.g., a wing) of a subsonic, transonic, supersonic, or hypersonic vehicle.

Embodiment 5. The method of any one of embodiments 1-4, wherein determining the wavefront distortions is performed via an instantaneous phase-shift interferometry by determining a phase shift of the laser beam directly by the wavefront sensor during the laminar air flow in the high speed or turbulent environment.

Embodiment 6. The method of any one of embodiments 1-5, wherein the determined optical degradation for the air flow in the high speed or turbulent environment is half of the determined wavefront distortions.

Embodiment 7. The method of any one of embodiments 1-6, further comprising: implementing corrections to the imaging system based on the determined optical degradation.

Embodiment 8. The method of embodiment 7, wherein the corrections to the imaging system are implemented by communicating the corrections to a user, outputting the corrections to a display, and/or facilitating auto adjustments in future wavefront measurements based on the corrections.

Embodiment 9. The method of any one of embodiments 1-8, wherein the imaging system further comprises, outside the module and in the high speed or turbulent environment, a second reflector disposed on a second laminar flow airfoil, wherein the laser beam is further split into a second optical axis such that the second reflector is configured to receive and reflect the laser beam along the second optical axis to-and-from the optical window.

Embodiment 10. A system comprising: an imaging system configured for wavefront measurements of air flows in a high speed or turbulent environment, the imaging system comprising: within a module, a wavefront sensor and one or more optical components configured for manipulating a laser beam, and an optical window configured for transmitting the laser beam in-and-out through the optical window, and outside the module and in the high speed or turbulent environment, a reflector disposed on a laminar flow airfoil, wherein the reflector is positioned along an optical axis facing the optical window and is configured to receive the laser beam from the optical window and to reflect the laser beam toward the optical window; a processor and a non-transitory computer readable medium operably coupled thereto, the processor operationally coupled and configured to control the imaging system and to acquire data from the imaging system, wherein the non-transitory computer readable medium comprising a plurality of instructions stored in association therewith that are accessible to, and executable by, the processor, to perform one or more operations, which comprise: obtaining, via the imaging system, a wavefront measurement of air flow; determining wavefront distortions of the laser beam based on the wavefront measurement; and determining optical degradation based on the wavefront distortions.

Embodiment 11. The system of embodiment 10, wherein the imaging system is configured for a double-pass configuration having the reflector disposed on the laminar flow airfoil to reflect the optical beam within the high speed or turbulent environment.

Embodiment 12. The system of embodiments 10 or 11, wherein the imaging system further comprises, outside the module and in the high speed or turbulent environment, a second reflector disposed on a second laminar flow airfoil, wherein the laser beam is further split into a second optical axis such that the second reflector is configured to receive and reflect the laser beam along the second optical axis to-and-from the optical window.

Embodiment 13. The system of any one of embodiments 10-12, wherein determining the optical degradation based on the wavefront distortions occurs in real time; and wherein determining the wavefront distortions is performed via an instantaneous phase-shift interferometry by determining a phase shift of the laser beam directly by the wavefront sensor during the air flow in the high speed or turbulent environment.

Embodiment 14. The system of any one of embodiments 10-13, wherein the high speed or turbulent environment comprises a subsonic, transonic, supersonic, or hypersonic flight environment and wherein the laminar flow airfoil is built into, or attached to, an appendage (e.g., a wing) of a subsonic, transonic, supersonic, or hypersonic vehicle.

Embodiment 15. The system of any one of embodiments 10-14, wherein the one or more operations further comprises implementing corrections to the imaging system based on the determined optical degradation by communicating the corrections to a user, outputting the corrections to a display, and/or facilitating auto adjustments in future wavefront measurements based on the corrections.

Embodiment 16. A system comprising: an imaging system configured for wavefront measurements of turbulent air flows in a subsonic, transonic, supersonic, or hypersonic environment, the imaging system comprising: within a module of the vehicle, a wavefront sensor and one or more optical components configured for manipulating a laser beam, and an optical window configured for transmitting the laser beam in-and-out through the optical window, and outside the module and attached to the vehicle, a reflector disposed on a laminar flow airfoil, wherein the reflector is positioned along an optical axis facing the optical window and is configured to receive the laser beam from the optical window and to reflect the laser beam toward the optical window; a processor and a non-transitory computer readable medium operably coupled thereto, the processor operationally coupled and configured to control the imaging system and to acquire data from the imaging system, wherein the non-transitory computer readable medium comprising a plurality of instructions stored in association therewith that are accessible to, and executable by, the processor, to perform one or more operations, which comprise: obtaining, via the imaging system, a wavefront measurement of a turbulent air flow; determining wavefront distortions of the laser beam based on the wavefront measurement; and determining optical degradation based on the wavefront distortions.

Embodiment 17. The system of embodiment 16, further comprising: a wing, wherein the laminar flow airfoil is built into, or attached to, the wing.

Embodiment 18. The system of embodiment 17, further comprising: a second wing comprising a second laminar flow airfoil, wherein the imaging system further comprises, outside the module, a second reflector disposed on the second laminar flow airfoil, wherein the laser beam is further split into a second optical axis such that the second reflector is configured to receive and reflect the laser beam along the second optical axis to-and-from the optical window.

Embodiment 19. The system of any one of embodiments 16-18, wherein determining the optical degradation based on the wavefront distortions occurs in real time; and determining the wavefront distortions is performed via an instantaneous phase-shift interferometry by determining a phase shift of the laser beam directly by the wavefront sensor during the turbulent air flow in the high speed or turbulent environment.

Embodiment 20. The system of any one of embodiments 16-19, wherein the one or more operations further comprises implementing corrections to the imaging system based on the determined optical degradation by communicating the corrections to a user, outputting the corrections to a display, and/or facilitating auto adjustments in future wavefront measurements based on the corrections.

Persons skilled in the art will recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A method, comprising:

obtaining, via an imaging system, a wavefront measurement of air flow in a high speed or turbulent environment, wherein the imaging system resides partially within a module, wherein the imaging system comprises, within the module, a wavefront sensor and one or more optical components configured for manipulating a laser beam, and an optical window configured for transmitting the laser beam in-and-out through the optical window, and wherein the imaging system further comprises, outside the module and in the high speed or turbulent environment, a reflector disposed on a laminar flow airfoil, wherein the reflector is positioned along an optical axis facing the optical window and is configured to receive the laser beam from the optical window and to reflect the laser beam toward the optical window;

determining wavefront distortions of the laser beam based on the wavefront measurement; and determining optical degradation based on the wavefront distortions.

2. The method of claim 1, wherein the imaging system is configured for a double-pass configuration having the reflector disposed on the laminar flow airfoil to reflect the optical beam within the high speed or turbulent environment.

3. The method of claim 1, wherein determining the optical degradation based on the wavefront distortions occurs in real time.

4. The method of claim 1, wherein the high speed or turbulent environment comprises a subsonic, transonic, supersonic, or hypersonic flight environment and wherein the laminar flow airfoil is built into, or attached to, an appendage (e.g., a wing) of a subsonic, transonic, supersonic, or hypersonic vehicle.

5. The method of claim 1, wherein determining the wavefront distortions is performed via an instantaneous phase-shift interferometry by determining a phase shift of the laser beam directly by the wavefront sensor during the air flow in the high speed or turbulent environment.

6. The method of claim 1, wherein the determined optical degradation for the air flow in the high speed or turbulent environment is half of the determined wavefront distortions.

7. The method of claim 1, further comprising:

implementing corrections to the imaging system based on the determined optical degradation.

8. The method of claim 7, wherein the corrections to the imaging system are implemented by:

communicating the corrections to a user, outputting the corrections to a display, and/or facilitating auto adjustments in future wavefront measurements based on the corrections.

9. The method of claim 1, wherein the imaging system further comprises, outside the module and in the high speed or turbulent environment, a second reflector disposed on a second laminar flow airfoil, wherein the laser beam is further split into a second optical axis such that the second reflector is configured to receive and reflect the laser beam along the second optical axis to-and-from the optical window.

10. A system comprising:

an imaging system configured for wavefront measurements of air flows in a high speed or turbulent environment, the imaging system comprising:

within a module, a wavefront sensor and one or more optical components configured for manipulating a laser beam, and an optical window configured for transmitting the laser beam in-and-out through the optical window, and outside the module and in the high speed or turbulent environment, a reflector disposed on a laminar flow airfoil, wherein the reflector is positioned along an optical axis facing the optical window and is configured to receive the laser beam from the optical window and to reflect the laser beam toward the optical window;

a processor and a non-transitory computer readable medium operably coupled thereto, the processor operationally coupled and configured to control the imaging system and to acquire data from the imaging system, wherein the non-transitory computer readable medium comprising a plurality of instructions stored in association therewith that are accessible to, and executable by, the processor, to perform one or more operations, which comprise:

obtaining, via the imaging system, a wavefront measurement of air flow;

determining wavefront distortions of the laser beam based on the wavefront measurement; and determining optical degradation based on the wavefront distortions.

11. The system of claim 10, wherein the imaging system is configured for a double-pass configuration having the reflector disposed on the laminar flow airfoil to reflect the optical beam within the high speed or turbulent environment.

12. The system of claim 10, wherein the imaging system further comprises, outside the module and in the high speed or turbulent environment, a second reflector disposed on a second laminar flow airfoil, wherein the laser beam is further split into a second optical axis such that the second reflector is configured to receive and reflect the laser beam along the second optical axis to-and-from the optical window.

13. The system of claim 10, wherein:

determining the optical degradation based on the wavefront distortions occurs in real time; and determining the wavefront distortions is performed via an instantaneous phase-shift interferometry by determining a phase shift of the laser beam directly by the wavefront sensor during the air flow in the high speed or turbulent environment.

14. The system of claim 10, wherein the high speed or turbulent environment comprises a subsonic, transonic, supersonic, or hypersonic flight environment and wherein the laminar flow airfoil is built into, or attached to, an appendage (e.g., a wing) of a subsonic, transonic, supersonic, or hypersonic vehicle.

15. The system of claim 10, wherein the one or more operations further comprises:

implementing corrections to the imaging system based on the determined optical degradation by communicating the corrections to a user, outputting the corrections to a display, and/or facilitating auto adjustments in future wavefront measurements based on the corrections.

16. A vehicle comprising:

an imaging system configured for wavefront measurements of turbulent air flows in a subsonic, transonic, supersonic, or hypersonic environment, the imaging system comprising:

within a module of the vehicle, a wavefront sensor and one or more optical components configured for manipulating a laser beam, and an optical window configured for transmitting the laser beam in-and-out through the optical window, and outside the module and attached to the vehicle, a reflector disposed on a laminar flow airfoil, wherein the reflector is positioned along an optical axis facing the optical window and is configured to receive the laser beam from the optical window and to reflect the laser beam toward the optical window;

a processor and a non-transitory computer readable medium operably coupled thereto, the processor operationally coupled and configured to control the imaging system and to acquire data from the imaging system, wherein the non-transitory computer readable medium comprising a plurality of instructions stored in association therewith that are accessible to, and executable by, the processor, to perform one or more operations, which comprise:

obtaining, via the imaging system, a wavefront measurement of a turbulent air flow;

determining wavefront distortions of the laser beam based on the wavefront measurement; and determining optical degradation based on the wavefront distortions.

17. The vehicle of claim 16, further comprising:

a wing, wherein the laminar flow airfoil is built into, or attached to, the wing.

18. The vehicle of claim 17, further comprising:

a second wing comprising a second laminar flow airfoil, wherein the imaging system further comprises, outside the module, a second reflector disposed on the second laminar flow airfoil, wherein the laser beam is further split into a second optical axis such that the second reflector is configured to receive and reflect the laser beam along the second optical axis to-and-from the optical window.

19. The vehicle of claim 16, wherein:

determining the optical degradation based on the wavefront distortions occurs in real time; and determining the wavefront distortions is performed via an instantaneous phase-shift interferometry by determining a phase shift of the laser beam directly by the wavefront sensor during the turbulent air flow in the high speed or turbulent environment.

20. The vehicle of claim 16, wherein the one or more operations further comprises:

implementing corrections to the imaging system based on the determined optical degradation by communicating the corrections to a user, outputting the corrections to a display, and/or facilitating auto adjustments in future wavefront measurements based on the corrections.

* * * * *